United States Patent
Shuttleworth et al.

[15] 3,672,117
[45] June 27, 1972

[54] HINGE PAN PACKER

[72] Inventors: James J. Shuttleworth; Carlton S. Sprague, both of Huntington; Howard P. Shuttleworth, Warren; Charles E. Zimmerman, Huntington; John A. Wiseman, Anderson, all of Ind.

[73] Assignee: Shuttleworth Machinery Corporation, Huntington, Ind.

[22] Filed: Feb. 26, 1970

[21] Appl. No.: 14,336

[52] U.S. Cl. ..................................53/35, 53/247, 53/248
[51] Int. Cl. ....................................B65b 5/06, B65b 35/38
[58] Field of Search..................53/26, 35, 166, 246, 247, 248

[56] References Cited

UNITED STATES PATENTS

| | | | |
|---|---|---|---|
| 2,956,384 | 10/1960 | Underwood | 53/248 X |
| 2,946,164 | 7/1960 | Potts et al. | 53/26 |
| 2,890,553 | 6/1959 | Day et al. | 53/247 X |

Primary Examiner—Robert L. Spruill
Attorney—Woodard, Weikart, Emhardt & Naughton

[57] ABSTRACT

Case packing method and apparatus wherein aerosol cans or other objects are moved from a conveyor onto a support plate hingedly mounted on a vertically movable carriage including grid guide fingers. A box conveyor positions a box under the carriage. A vacuum head is movable downwardly into engagement with the objects, whereupon the vacuum head attaches to the objects. The vacuum head continues to move downwardly until the objects are placed in the box and the vacuum is turned off. The vacuum head is then returned to its starting position. During the downward stroke of the head, the carriage is first stationary until the head attaches to the objects. Then the carriage moves with the head until the guide fingers are inserted into the box and are holding it in position. Next the support swings on the carriage out from under the objects. The carriage is then stopped and the head passes through the carriage and the guide fingers to place the objects in the box.

10 Claims, 12 Drawing Figures

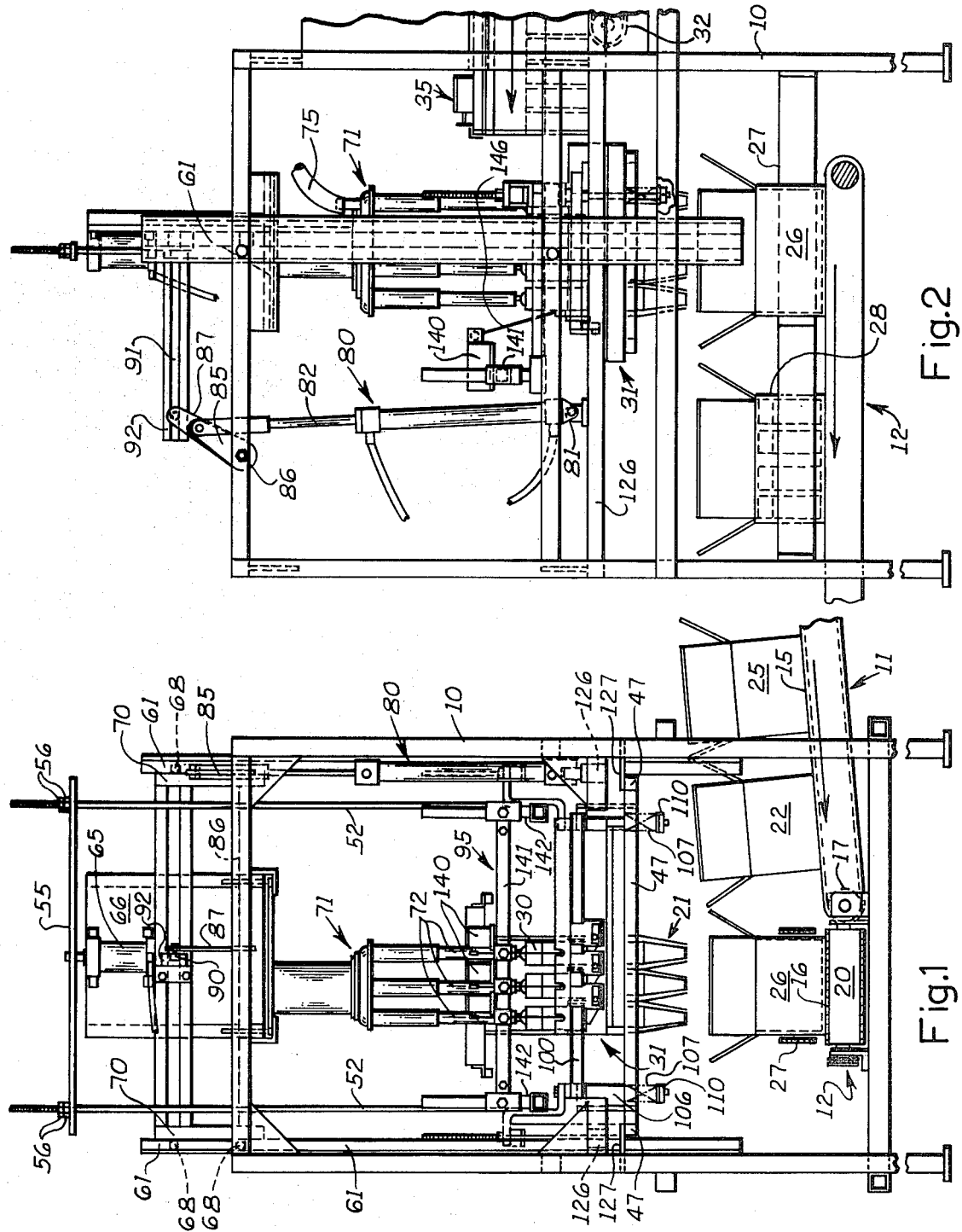

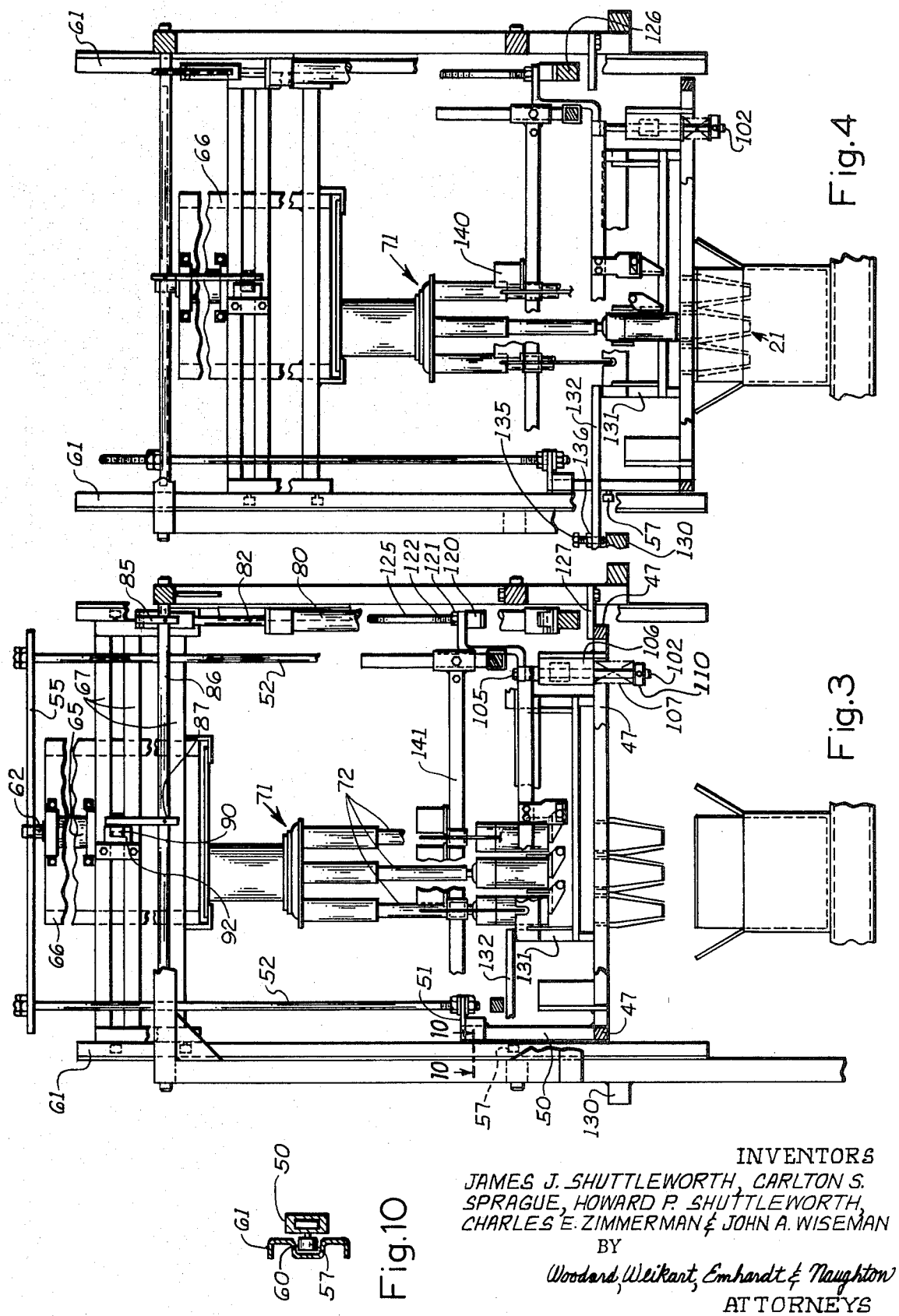

INVENTORS
JAMES J. SHUTTLEWORTH, CARLTON S. SPRAGUE, HOWARD P. SHUTTLEWORTH, CHARLES E. ZIMMERMAN & JOHN A. WISEMAN
BY
Woodard, Weikart, Emhardt & Naughton
ATTORNEYS

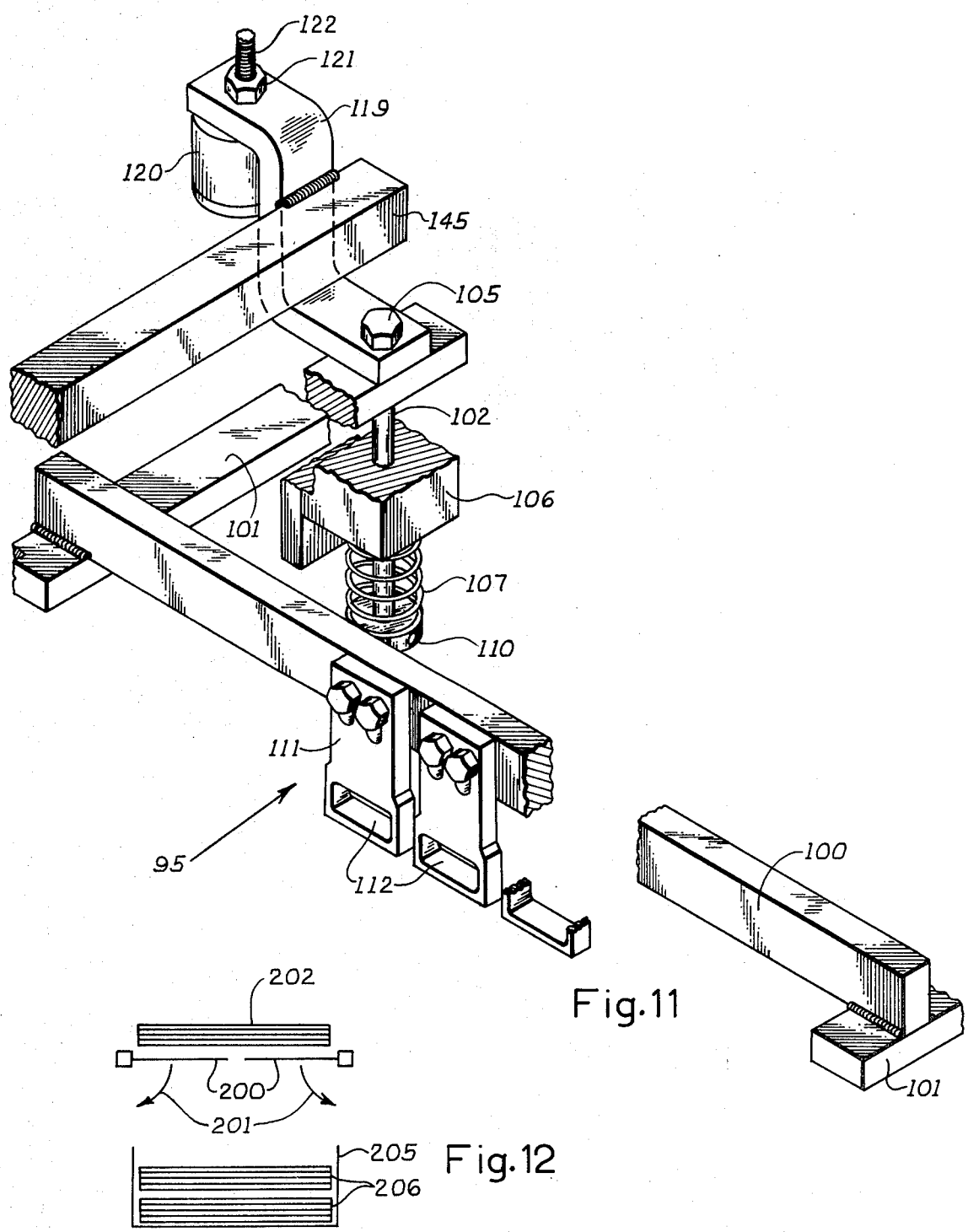

//'# HINGE PAN PACKER

BACKGROUND OF THE INVENTION

1. Field of the Invention

This invention relates to case packing method and apparatus for automatically packing cans, glass jars, bottles, tile packages and the like and particularly aerosol cans in a box or case.

Description of the Prior Art

Various devices are known and commercially available for automatically packing cans in cases or boxes. One such device, which has been successful commercially, is shown, for example, in U.S. Pat. No. 3,386,224 to one of the inventors of the present invention. The device disclosed in that patent uses a vacuum head with vacuum cups to lift cans off of a pan which is then moved horizontally out from under the cans whereupon the cans are lowered by the head and cups into the box. From time to time one of the vacuum cups will fail to securely attach to the cans and the can will in some cases jam the apparatus or in other cases fail to reach the intended destination of the box. Aerosol cans are a particular problem in that their tops are frequently not securely attached and tend to be pulled off of the respective cans when the cans are lifted by the vacuum head. One proposed solution to this problem is a drop packer which operates to drop the cans directly into the box. It can be appreciated, however, that such drop packers can be rough on aerosol cans and can lock the tops off of such cans. Also such drop packers do not always position the cans in the box as accurately as might be desired.

SUMMARY OF THE INVENTION

One embodiment of the method of this invention might involve a process for packing objects in cases which comprises the steps of moving the objects onto a support, attaching vacuum cups to the tops of the objects, lowering the vacuum cups and the support as well as a set of grid guide fingers toward a case until the guide fingers project into the case and hold it in position for reception of the objects, and moving said support out from below said objects while simultaneously continuing to move said vacuum cups toward said case and through said grid guide fingers to place the objects in the case.

One embodiment of the apparatus of this invention might involve case packer apparatus comprising a frame, a hinge pan and grid assembly mounted on said frame for vertical movement, said assembly including a downwardly projecting grid proportioned and arranged to guide objects downwardly, a vacuum head mounted on said frame for vertical movement, said assembly including a support mounted thereon which is hinged to said assembly, means for locating a box beneath said assembly, means for moving objects onto said support, means for moving said assembly downwardly to a first position wherein said grid holds said box and provides guide means for the objects into said box, and means actuated by said assembly moving into said first position for actuating said support to swing downwardly and away from said objects to permit said objects to move into said box.

Objects of this invention are to provide an improved case packer; to provide a case packer which reduces the likelihood of can tops not being properly located on the tops of cans during packing of cans; to provide a case packer which has a reduced chance of jamming; and to provide a faster operating case packer.

Related objects and advantages will become apparent as the description proceeds.

BRIEF DESCRIPTION OF THE DRAWINGS

FIG. 1 is a front elevation of a case packer embodying this invention;

FIG. 2 is a side elevation of the case packer of FIG. 1;

FIG. 3 is an enlarged view similar to FIG. 1 with certain portions broken away to illustrate internal construction;

FIG. 4 is a view similar to FIG. 3 but showing the apparatus in a different operating position;

FIG. 10 is an enlarged section taken along the line 10—10 of FIG. 3;

FIG. 11 is a perspective view of the stop assembly with other structure removed for clarity.

FIG. 12 is a schematic view of an alternative embodiment of the invention.

DESCRIPTION OF THE PREFERRED EMBODIMENTS

Figure 5:
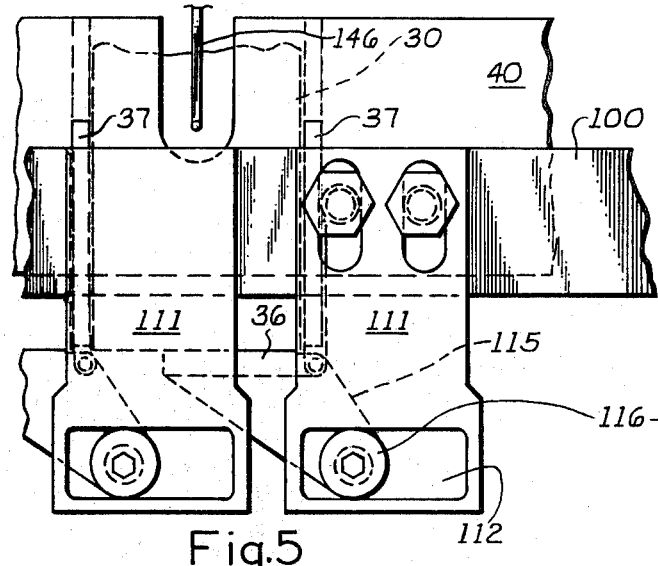
FIG. 5 is a fragmentary detail view of a stop assembly and a hinge pan and grid assembly forming a part of the present device.

Referring now more particularly to the drawings, the case packer includes a frame 10 upon which is mounted a box input conveyor 11 and a box output conveyor 12 both of which are conventional and include endless belts 15 and 16 received upon and driven by the rollers 17 and 20 mounted for rotation on the frame 10. The function of the conveyor 11 is to move boxes onto the conveyor 16 to a position directly below the grid 21. The following boxes 22 and 25 are pushed by the conveyor 11 and push the box 26 into a position where it is stopped by the side guide 27. While the conveyor 11 is so operating, the conveyor 16 is stopped. After the box 26 has been filled with objects such as aerosol cans, the conveyor 16 functions to move the filled box leftwardly as shown for example for the box 28 in FIG. 2. Various conveyor means can be used for moving the empty boxes with their flaps open into the position of the box 26 and for moving the boxes out of that position after they have been filled the only important criteria being that the boxes are accurately positioned directly below the grid during filling. An example of a suitable such conveyor means is illustrated in U.S. Pat. to Shuttleworth No. 3,386,224.

The present apparatus can be used for high speed packing of many types of objects, but is particularly adapted for packing aerosol cans 30. The cans 30 are moved onto the hinge pan assembly 31 by the conveyor 32. The conveyor 32 can take various forms and may, for example, be identical to the can conveyor 13 of the Shuttleworth U.S. Pat. No. 3,386,224. The can conveyor also incorporates hold back means 35 which is identical to the hold back mechanism 210 of the patent. The hold back means functions to stop the movement of the cans on the conveyor 32 while the cans on the hinge pan and grid assembly 31 are packed in the box 26.

The hinge pan and grid assembly 31 includes a plurality of parallel hinged plates or supports 36 (only one shown) upon which the cans rest. The hinged supports 36 are pivotally connected to respective parallel divider rails 37 which are in turn fixed to cross member 40 which acts as a stop for the cans. A pair of posts 41 are fixed to the cross member 40 and also to horizontal bars 42 and 45. The grid 21 is made of spring steel members 46 which are fixed at their upper ends to the horizontal members 42 and 45. The members 46 are arranged in a pattern 48 including groups of four of the members 46 with each group defining a guideway or passageway for a can 30. The resilient grid spring members are tapered inwardly and are shaped to fit the boxes and the lattice work dividers in the boxes, yet are sufficiently flexible and bendable to yield if the boxes are not precisely positioned. The grid 21 provides final box positioning, holds the boxes in place during filling and guides the cans into the boxes.

The hinge pan and grid assembly 31 is fixedly mounted on or may include horizontal grid frame members 47 which are fixed to one another and have secured to them vertically extending members 50 (only one shown in FIG. 3). The members 50 have angles 51 fixed thereto to which are fixed rods 52. The rods 52 are slidably mounted in a horizontal cross bar 55. Fixed to the upper ends of each of the rods are two nuts 56 back to back. The nuts 56 act as limits permitting the rods 52 to move downwardly only a limited distance before they contact the cross bar 55 and are thereby limited in movement. The rods 52 support and determine the vertical position of the hinge plate and grid assembly at least relative to the cross bar. The hinge plate and grid assembly is also maintained positioned in a horizontal direction by rollers 57 mounted on each of the vertical members 50. The rollers 57 ride in the vertical grooves 60 provided by the track members 61 which are fixed to the frame 10 (FIG. 10).

The cross bar 55 is fixed to the piston 62 of a pneumatic cylinder 65 which is mounted on plate 66. The plate 66 has a plurality of horizontal bars 67 fixed thereto. At the opposite ends of the bars are fixed vertically extending members 70 each of which has a pair of vertically spaced rollers 68 rotatably mounted thereon and guided in the grooves 60 in the same fashion as the rollers 57 are guided. The plate 66 has fixed thereto a head 71 which has a plurality of vacuum cups 72 mounted thereon and depending therefrom. The vacuum cups are supplied with vacuum through the head 71 and vacuum hose 75 secured to the head. The vacuum is turned on when it is desired to attach to objects with the cups and is turned off when it is desired to release objects with the cups. The structure and operation for providing vacuum to the vacuum cups may be the same as disclosed in U.S. Pat. No. 3,386,224 to Shuttleworth.

A hydraulic cylinder motor 80 is provided for raising and lowering the hinge plate and grid assembly. The cylinder 80 is pivoted at 81 to the frame 10 and has its piston 82 pivoted to a lever 85. The lever 85 is fixed to a shaft 86 which is rotatably mounted in the frame 10. Fixed to the shaft 86 is a further lever 87 to which is rotatably mounted a roller 90 which travels in the groove 91 of track member 92. The track member 92 is fixedly mounted to the plate 66. When the hydraulic cylinder is operated to retract its piston, the roller 90 is moved downwardly and causes the plate 66, head 71 and rods 52 to move downwardly. These parts are all raised when the piston 82 is projected.

A stop assembly 95 is mounted for vertical movement on the hinge plate and grid assembly. The stop assembly includes a transversely-extending horizontal cam-mounting bar 100 and members 101 which are fixed to the bar 100 and extend longitudinally of the machine. Each of a pair of vertical rods 102 are secured to the respective members 101. The rods 102 each have a head 105 and each extend through a bearing block 106 fixed to the hinge plate and grid assembly. Each of the rods 102 has a compression spring 107 thereon and a retainer collar 110 which is fixed to the rod 102. The springs 107 function to hold the stop assembly down against the hinge plate and grid assembly, i.e., the bars 101 down against the bearing blocks 106. Fixed to the horizontal bar 100 is a plurality of cams 111 having can slots 112. Each of the hinged supports 36 has a lever 115 fixed thereto with an integral cam follower 116 which rides in a respective cam slot 112. When the hinge plate and grid assembly is moved downwardly relative to the stop assembly the levers 115 swing the hinged supports 36 downwardly permitting the cams to move past the supports.

The stop assembly 95 travels with the hinge pan and grid assembly except at the lower portion of the stroke of the hinge pan and grid assembly. The stop assembly has mounted thereon stop members 120 which are vertically adjustable by means of nuts 121 and threads 122 on rods 125 to which the stop members 120 are secured. The stop members 120 are secured to the stop assembly by members 119 each received under the head of a respective rod 102. The stop members 120 engage (as limit stops) the frame members 126 which are a part of the frame. The hinge pan and grid assembly 31 is limited in its upward movement by the stop 127 which is fixed to the frame 10 and is limited in its downward movement by the frame member 130 forming a part of the frame 10. The assembly 31 includes a vertical post 131 to which is fixed the horizontal member 132. A plurality of screws 135 (one shown) are threaded into the horizontal member 132 and are locked in position by the nuts 136 (one shown). The screws are thereby adjustable and act as a stop member engaging the frame members 130 when the hinge pan and grid assembly reaches the lower end of its travel.

A plurality of switches 140 are mounted on a horizontal member 141. The horizontal member is adjustably secured at its opposite ends to two vertical members 142 each fixed to a respective horizontal bar 145. The two horizontal bars 145 are secured to the respective members 119 so that the switches are fixed to and move with the stop assembly 95. Each of the switches 140 has an actuating arm 146 which is engaged by the cans when the hinge support with which the switch is associated is filled with cans. When all of the switches 140 are actuated the apparatus starts its cycle. The switches 140 act similarly to the switches 350 of U.S. Pat. No. 3,386,224 to start the cam arrangement described in the patent although of course other suitable controls can be used.

In operation, the apparatus starts a cycle with the vacuum cups raised above the cans 30. Also the hinge plate and grid assembly 31 is at the uppermost end of its travel as is the stop assembly 95. Thus, the frame member 47 of the hinge plate assembly is engaging the stop 127. The pneumatic cylinder 65 has air pressure maintained in it at all times. This air pressure is provided to the pneumatic cylinder in such a way as to project or tend to project the piston 62. The piston 62 is however forced to a retracted position by the cylinder 80 which, through hydraulic pressure, is holding the plate 66 upwardly. Thus, because the cross bar 55 is held downwardly by the hinge pan and grid assembly and the rods 52 and nuts 56, the piston 62 is held or forced into a retracted or compressed position.

The hydraulic cylinder 80 is actuated when the can pattern is complete by the actuation of the switches 140. Actuation of the cylinder 80 causes the vacuum head to be moved downwardly relative to the cross bar 55 by projection of the piston 62. The vacuum cups move downwardly to engage the tops of the individual cans. The apparatus is so adjusted that the vacuum head comes down and kisses or barely touches the tops of the cans when the piston 62 is fully projected by the air pressure in the cylinder 65. At the beginning of the cycle the vacuum is also actuated so that the vacuum cups adhere to the tops of the individual cans. Until the piston 62 is fully projected the cross bar does not begin to move downwardly. When the piston is fully projected, the head 71, the cans 30, the hinge pan and grid assembly and the stop assembly begin downward movement together.

The function of the pneumatic cylinder 65 after the vacuum cups have engaged the cans, as well as at the time of engagement, is to act as a spring or cushion. In FIGS. 1, 2 and 3, the apparatus is shown after the vacuum cups have engaged the cans but before hinge plate and grid assembly has moved downward Thus, the projections 127 are in engagement with the grid frame members 47 and the cross bar 55 is supporting the hinge plate and grid assembly and the stop assembly through the rods 52. As the plate 66 continues downwardly, the cross bar 55 starts to move downwardly as well as the rods 52, stop assembly 95 and the hinge plate and grid assembly. The grid 21 is thereby moved down in to the box 26 positioning and holding the box and providing guide means for the cans to channel them into the proper openings in the box.

The cylinder 80 continues to move the stop assembly and the hinge plate and grid assembly downwardly until the stop assembly bottoms out by engagement of the stop members 120 with frame members 126. The hinge plate and grid assembly, however, continues its downward movement causing the springs 107 to be compressed and causing the supports 36 to be cammed open. Before the hinge plate and grid assembly reaches the lower limit of its travel, the supports 36 are cammed completely open. The vacuum head 71 will support the cans 30 in most cases, although in some cases the top on an aerosol can is not securely attached to the can. Even though a particular can does not remain secured to its top, the can will not jam the operation of the case packer but instead will drop downwardly to be guided through the grid into the box 26. At the time that the supports swing open the guide 21 is at almost the lower end of its travel and is holding the box in position and is ready to guide cans.

The head 71 and the hinge plate and grid assembly will continue to move downwardly until the stop members 135 engage the frame members 130 at which time the hinge plate and grid assembly stops. The grid 21 is now in the position of FIG. 4 where it holds the box in position and is ready to guide cans. The cylinder 80 continues to move the head 71 downwardly moving the cans and their tops down through the grid 21 until the cans reach the bottom of the box. When the cans do reach the bottom of the box, the hydraulic cylinder 80 is caused to reverse. The apparatus may be provided with a stalling-out relief-valve type of operation as described at column 8, lines 22-27 of said U.S. Pat. No. 3,386,224. Also the cans which have lost their tops, if any, will have their tops replaced on the cans by causing the head to move at least a sufficient distance into the box to accomplish this.

After the head reaches the bottom of its stroke, the vacuum is shut off as described in said patent and the cylinder 80 is reversed and causes to project its piston. Also the pneumatic cylinder 65 is caused to retract its piston. All of the parts are thereby returned to their original starting position. First, the head 71 starts to move upwardly. Next, the hinge pan and grid assembly starts to move upwardly when the cross bar 55 reaches the nuts 56 on the rods 52. This motion of course closes the hinge supports. Next, the stop assembly starts to move upwardly when the bearing blocks 106 engage the bar 101. Next the hinge pan and grid assembly reaches the top end of its travel by engaging the stops 127. Continued travel of the plate 66 upwardly causes the piston 62 to be depressed against the pneumatic pressure therein, but permits the head 71 to have its vacuum cups positioned above the path of the cans 30. Thus, the cans are permitted to freely move onto the supports without the interference of the vacuum cups.

When the head has reached this position, the conveyors 11 and 12 are again operated to place a new box in position and the gates or hold back means 35 are operated to permit cans to again be moved onto the hinge pan supports 36 by the conveyor 32. After the hinge pan has been filled, the cycle again repeats itself.

Figure 6:
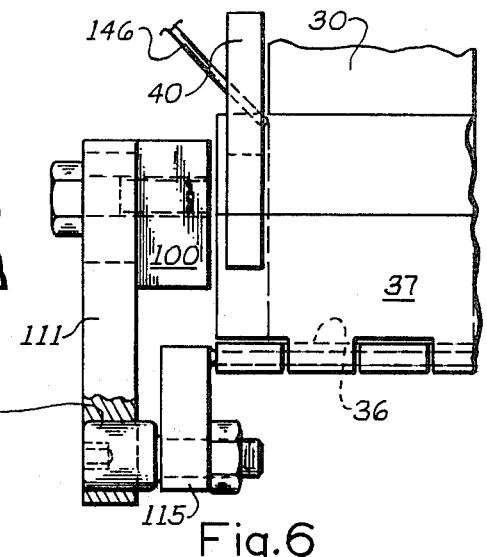
FIG. 6 is a side elevation of the structure illustrated in FIG. 5.
Figure 7:
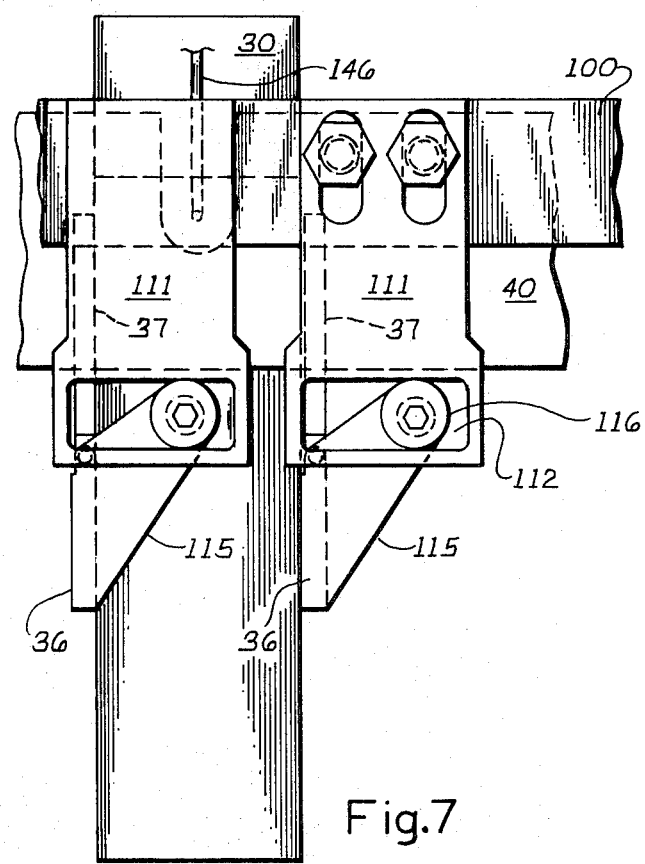
FIG. 7 is a view similar to FIG. 5 showing a different operating position.
Figure 8:
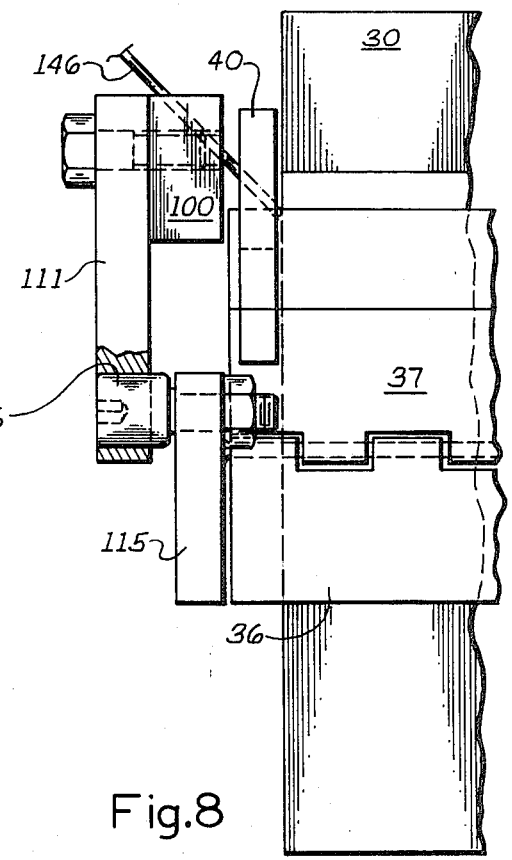
FIG. 8 is a side elevation of the structure illustrated in FIG. 7.
Figure 9:
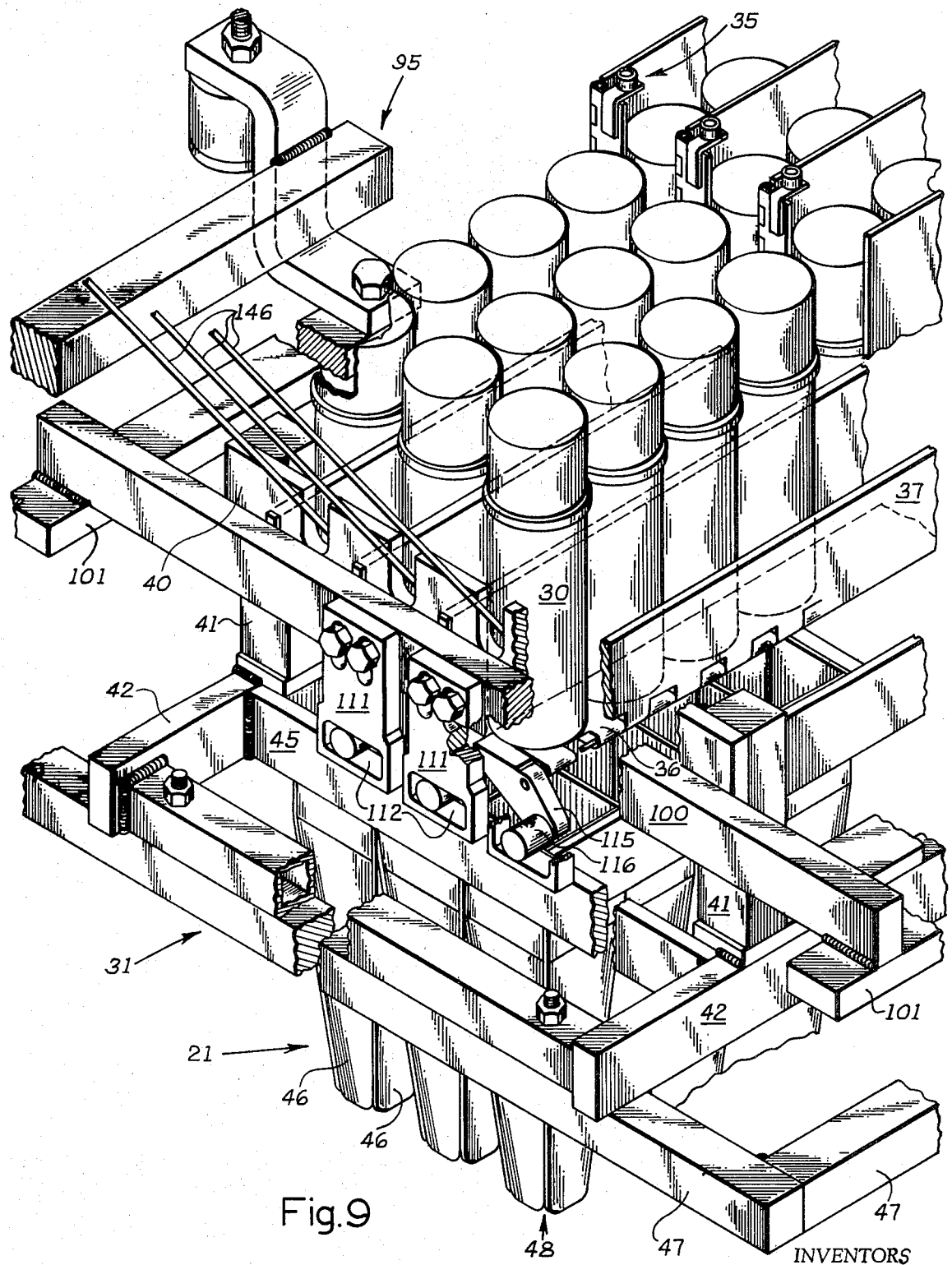
FIG. 9 is a perspective view of the hinge pan and grid assembly and stop assembly with other structure removed for clarity.

It will be evident from the above description that this invention is particularly useful in the packing of aerosol cans because of the smooth and complete handling of the cans and their tops all the way into the box. The invention has other applications and variations. For example, because of the high speed of packing that can be accomplished, it is very useful in packing floor tile into boxes in layers. In such an application no vacuum is needed in the vacuum head and the hinge plates 200 (FIG. 12) are two in number and project toward one another when the plates are horizontal. The plates swing downwardly and away from one another in the direction of the arrows 201 to permit a package 202 of tile to be moved between the plates into the box 205. As shown, packages 206 are stacked in the box 205, this stacking being accomplished in the fashion described in said U.S. Pat. No. 3,386,224. The various other details of this alternative embodiment are as described above in connection with FIGS. 1–11.

We claim:

1. Case packer apparatus comprising a frame, a hinge pan and grid assembly mounted on said frame for vertical movement, said assembly including a downwardly projecting grid proportioned and arranged to guide objects downwardly, a vacuum head mounted on said frame for vertical movement, said assembly including a support mounted thereon which is hinged to said assembly, means for locating a box beneath said assembly, means for moving objects onto said support, means for moving said assembly downwardly to a first position wherein said grid holds said box and provides guide means for the objects into said box, and means actuated by said assembly moving into said first position for actuating said support to swing downwardly and away from said objects to permit said objects to move into said box.

2. The invention of claim 1 additionally comprising vertical rod means fixed to said hinge pan and grid assembly, a cross bar slidably receiving said rod means, limit means attached to said rod means above said cross bar and limiting the downward movement of said hinge pan and grid assembly relative to said cross bar, a pneumatic cylinder motor including a cylinder member and a piston member with one of said members secured to said cross bar and one fixed relative to said vacuum head, said means for moving said assembly comprising a hydraulic cylinder motor coupled between said frame and said head, and a pair of limits on said frame for limiting the vertical travel of said hinge pan and grid assembly, one of said limits preventing downward movement of said assembly past said first position, the other of said limits preventing upward movement of said assembly past a second position wherein said support receives objects from said means for moving objects, said pneumatic cylinder motor being operable to yieldably maintain said cross bar upward relative to said head when said pneumatic cylinder motor is at the end of its stroke, said hydraulic cylinder being operable to force said head upwardly against the force of said pneumatic cylinder a sufficient distance to cause said head to be out of the path of objects when said assembly is in said second position.

3. The invention of claim 2 wherein said head is adjusted to barely contact the top of said objects when said pneumatic cylinder is at the end of its stroke and said assembly is in its second position, said assembly being arranged to hang by gravity on rods as said assembly moves from said second position to said first position whereby said head moves with said assembly between said second and first position.

4. The invention of claim 3 wherein said means for actuating said support comprises a stop assembly mounted for vertical movement on said hinge pan and grid assembly, spring and limit means yieldably holding said stop assembly in a downward position relative to said hinge pan and grid assembly, a stop on said frame arranged to block movement of said stop assembly prior to said hinge pan and grid assembly moving into said first position, and cam means connecting said stop assembly and support and arranged to hold said support up in a horizontal position when said stop assembly is in said downward position and to swing said support downwardly when said hinge pan and grid assembly moves downwardly relative to said stop assembly.

5. The invention of claim 3 wherein said means for actuating said support comprises a stop assembly mounted for vertical movement on said hinge pan and grid assembly, spring and limit means yieldably holding said stop assembly in a downward position relative to said hinge pan and grid assembly, a stop on said frame arranged to block movement of said stop assembly prior to said hinge pan and grid assembly moving into said first position, and cam means connecting said stop assembly and support and arranged to hold said support up in a horizontal position when said stop assembly is in said downward position and to swing said support downwardly when said hinge pan and grid assembly moves downwardly relative to said stop assembly.

6. The invention of claim 1 additionally comprising a pair of vertical rods fixed to said hinge pan and grid assembly, a cross bar slidably receiving said rods, vertically adjustable limit means attached to said rod above said cross bar and limiting the downward movement of said hinge pan and grid assembly relative to said cross bar, a carriage carrying said vacuum head and providing said mounting on said frame for vertical movement, a pneumatic cylinder motor including a cylinder mounted on said carriage and a piston secured to said cross bar, said means for moving said assembly comprising a hydraulic cylinder motor including a cylinder pivoted to said frame and a piston arranged to move said carriage vertically, and a pair of limits on said frame for limiting the vertical travel of said hinge pan and grid assembly, one of said limits preventing downward movement of said assembly past said first position, the other of said limits preventing upward movement of said assembly past a second position wherein said support receives objects from said means for moving objects, said pneumatic cylinder motor having pressure therein for yieldably maintaining said piston projected and said cross bar upward relative to said head, said hydraulic cylinder being operable to force said head upwardly against the force of said pneumatic cylinder a sufficient distance to cause said head to be out of the path of objects when said assembly is in said second position.

7. The invention of claim 6 wherein said means for actuating said support comprises a stop assembly mounted for vertical movement on said hinge pan and grid assembly, spring and limit means yieldably holding said stop assembly in a downward position relative to said hinge pan and grid assembly, a stop on said frame arranged to block movement of said stop assembly prior to said hinge pan and grid assembly moving into said first position, and cam means connecting said stop assembly and support and arranged to hold said support up in a horizontal position when said stop assembly is in said downward position and to swing said support downwardly when said hinge pan and grid assembly moves downwardly relative to said stop assembly.

8. A process for packing objects in cases which comprises the steps of moving the objects onto a support, attaching vacuum cups to the tops of the objects, lowering the vacuum cups and the support as well as a set of grid guide fingers toward a case until the guide fingers project into the case and hold it in position for reception of the objects, and moving said support out from below said objects while simultaneously continuing to move said vacuum cups toward said case and through said grid guide fingers to place the objects in the case.

9. A process for packing objects in cases which comprises the steps of moving an object onto a support, lowering the support as well as a set of grid guide fingers toward a case until the guide fingers project into the case and hold it in position for reception of an object, and moving said support out from below the object to permit said object to pass through said grid guide fingers to place the object in the case, and;

moving a pusher element downwardly above the object simultaneously with the lowering of said support, the additional step of stopping said grid fingers after said support has been moved out from below said object, and the step of moving said pusher element through said fingers to place the object in the case.

10. A process for packing objects in cases which comprises the steps of moving an object onto a support, lowering the support as well as a set of grid guide fingers toward a case until the guide fingers project into the case and hold it in position for reception of the object, moving said support out from below the object to permit said object to pass through said grid guide fingers to place the object in the case, moving a pusher element downwardly above the object simultaneously with the lowering of said support, and moving said pusher element through said fingers to place the object in the case.

* * * * *